Oct. 5, 1943.   J. E. GRIFFITH   2,331,024
SPRING TIRE FOR VEHICLES
Filed May 30, 1942
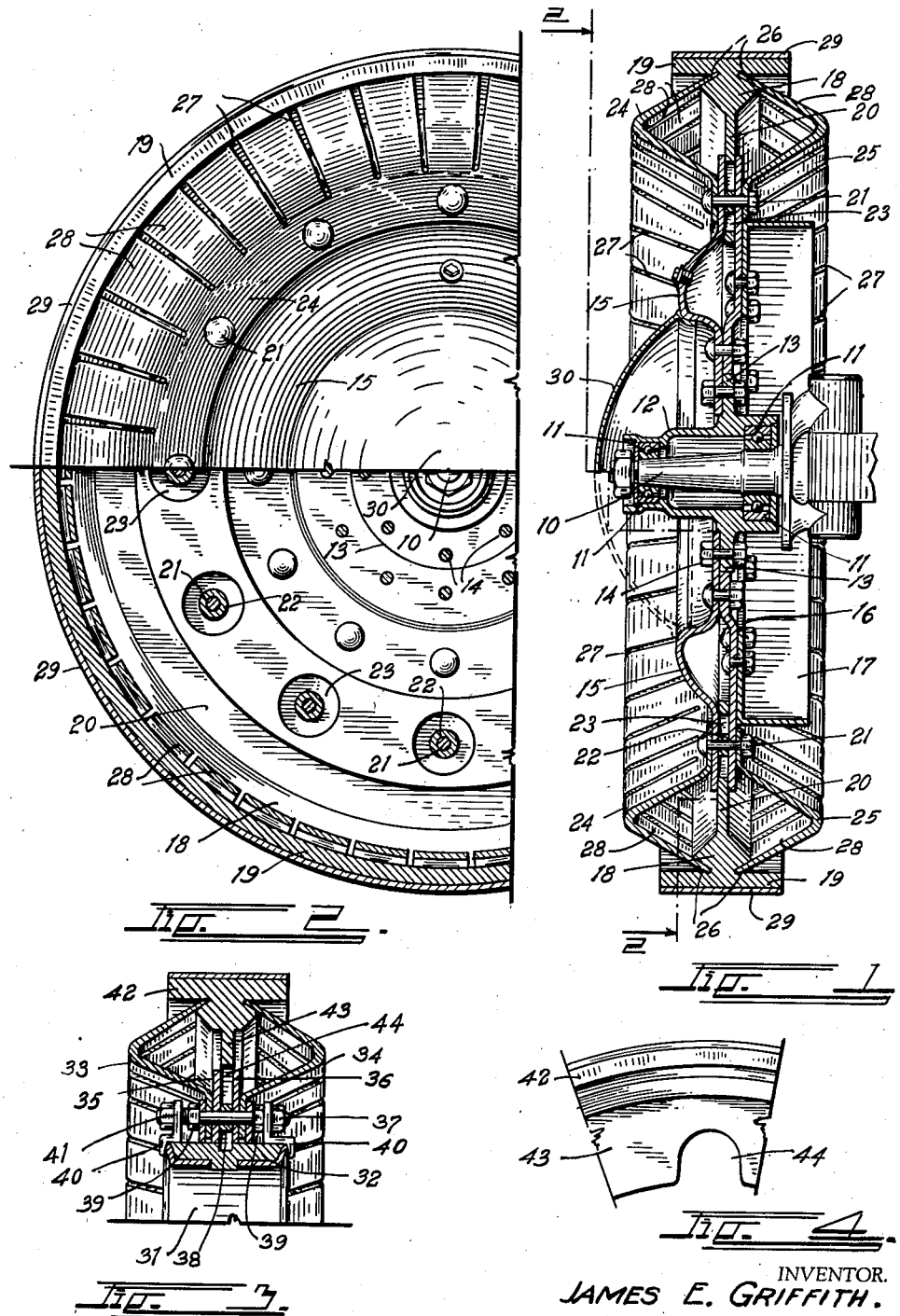
INVENTOR.
JAMES E. GRIFFITH.
BY
ATTORNEY.

Patented Oct. 5, 1943

2,331,024

UNITED STATES PATENT OFFICE 2,331,024

SPRING TIRE FOR VEHICLES

James E. Griffith, Denver, Colo.

Application May 30, 1942, Serial No. 445,408

6 Claims. (Cl. 152—85)

This invention relates to a resilient wheel for automotive vehicles and has for its principal object the provision of a wheel structure which will eliminate the necessity for rubber tires so as to relieve the demand on rubber to liberate the latter for war uses.

Other objects of the invention are to provide a spring wheel structure in which all of the springs regardless of their position in the wheel will be exerting a cushioning effect thereon at all times; to provide a spring wheel structure which is instantly replaceable with the present standard pneumatic tired wheels; and to provide a device which can, if desired, be constructed to replace the present pneumatic tires on the present wheels and rims.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical cross section through the improved resilient wheel;

Fig. 2 is a side view of the improved wheel partially in section, the section being taken on line 2—2, Fig. 1;

Fig. 3 is a cross section through the alternate form of the invention designed to replace the present pneumatic tires; and Fig. 4 is a fragmentary detail view of the tread ring employed in the alternate form.

In the drawing, a typical wheel axle spindle is indicated at 10 with its wheel bearings at 11, the usual wheel hub at 12, and hub cap at 30. The wheel hub 12 carries the usual wheel flange 13 from which the standard wheel studs 14 project. As thus far described, the structure is the usual construction to which a wheel disc and its surrounding tire are ordinarily bolted. The improved wheel simply replaces the standard wheel on the studs 14.

The wheel comprises a wheel disc 15 designed to fit over the studs 14. A second inner wheel disc 16 of the same outer diameter as the disc 15 is bolted, welded or otherwise secured to the inner face of the disc 15. The outer edges of these two discs are spaced-apart. The inner disc 16 carried the usual brake drum 17. A tread ring 18 surrounds the two discs.

The ring 18 is T-shaped in cross section having a flat, band-like tread portion 19 and a disc-like, inwardly projecting, central tread flange 20. The tread flange 20 extends inwardly between the two separated discs 15 and 16 and is slidable therebetween. The flange is held in place by means of flange bolts 21 which pass through spacing washers 22 acting as spacers for the discs. Relatively large bolt holes 23 are formed in the flange 20 about the spacing washers 22.

The tread ring 18 is constantly urged outwardly from wheel discs by means of outer and inner spring rings 24 and 25, respectively. The spring rings are secured to the outer and inner faces of the discs 15 and 16, respectively, by means of the flange bolts 21. Each of the spring rings is V-shaped in cross section. They are positioned with their open sides facing toward each other and with their outer edges engaging in receiving notches 26 in the opposite sides of the flange 20, immediately inside of the tread band 19.

While the spring rings 24 and 25 are each in themselves complete integral units, their outer spring portions are separated, by a plurality of radially extending slots 27, into separate spaced-apart spring tongues 28.

The action of the wheel is believed to be readily apparent. Downward pressure on the axle spindle 10 forces the two discs 15 and 16 downwardly causing the two sides of the V-shaped spring members to be flexed toward each other at the bottom of the wheel and to be flexed away from each other at the top of the wheel. Thus, all of the spring tongues 28 around the entire wheel exert some action to resist or cushion the downward movement of the spindle 10, depending upon their position in the wheel. The maximum action is, of course, on a vertical line from the point of contact at the forward and back sides of the wheel. The action results in a combined sliding and twisting movement on the spring tongues at the front and back of the tread ring. The enlarged openings 23 allow sufficient space for the vertical movement at the front and back of the wheel. The tread band 19 may be covered with any suitable wear resisting and noise reducing tire 29.

In Fig. 3, the same principle of construction is employed to provide what might be termed a spring tire which can be placed on any standard pneumatic tire rim, such as illustrated at 31. To adapt the rim 31 to receive the spring tire, the former is preferably provided with a filler 32 which fills the groove between the standard rim flanges.

The improved spring tire employs two inwardly facing, V-shaped, annular spring members 33 and 34 similar to the rings 24 and 25 previously described. The spring members are bolted on the opposite sides of two annular guide plates 35 and 36 which are held in spaced relation on a plurality of bolts 37 by means of spacing washers 38. The entire assembly is clamped between two clamp nuts 39 on each of the bolts 37. The bolts are threaded at both extremities and carry at each extremity a rim engaging lug 40. The lugs 40 are clamped against the sides of the rim 31 by means of ring clamping nuts 41.

A tread ring 42 surrounds the spring members 33 and 34. The tread ring has a medial, inwardly extending, metal flange 43 which slides between the two guide bands 35 and 36. The flange 43 is notched, as shown at 44, where it passes the bolts 37 and their spacing washers 38. The action of the spring tire is exactly the same as the action of the spring wheel previously described. The latter replaces the entire wheel and the former simply replaces the pneumatic tire thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A resilient wheel comprising: a wheel portion; an annular tread portion; an annular spring member surrounding the wheel portion at each face thereof; a ring-like flange extending inwardly from the middle of said tread portion between the two spring members; separating members maintaining the two spring members in spaced relation; and bolts clamping the two spring members against said separating members, said flange having openings for the passage of said separating members and said bolts.

2. A resilient wheel comprising: a wheel portion; an annular tread portion; an annular spring member surrounding the wheel portion at each face thereof; a ring-like flange extending inwardly from the middle of said tread portion between the two spring members; separating members maintaining the two spring members in spaced relation; and bolts clamping the two spring members against said separating members, said flange having openings for the passage of said separating members and said bolts, said openings being sufficiently large to allow movement around the bolts in all directions therein.

3. A resilient wheel for attachment to a hub flange having wheel attachment studs comprising: a wheel disc arranged to be secured on said flange by said studs; an inner disc secured adjacent its axis to the inner face of said wheel disc; spaced-apart separating members between the outer edges of the two discs; means for securing the discs against the spaced separating members; a cylindrical tread surrounding said discs; a medial flange member extending inwardly from said tread to a slidable position between the two discs, said flange member having openings for the passage of the separating members; and means for cushioning the radial movements of said tread.

4. A resilient wheel for attachment to a hub flange having wheel attachment studs comprising: a wheel disc arranged to be secured on said flange by said studs; an inner disc secured adjacent its axis to the inner face of said wheel disc; spaced-apart separating members between the outer edges of the two discs; means for securing the discs against the spaced separating members; a cylindrical tread surrounding said discs; a medial flange member extending inwardly from said tread to a slidable position between the two discs, said flange member having openings for the passage of the separating members; an annular spring ring secured about the periphery of each of said discs and projecting outwardly therebeyond, each of said spring rings extending first outwardly from the face of its disc thence inwardly to the medial flange of said tread, there being receiving notches in said flange for the outer edges of said spring rings.

5. A resilient wheel for attachment to a hub flange having wheel attachment studs comprising: a wheel disc arranged to be secured on said flange by said studs; an inner secured adjacent its axis to the inner face of said wheel disc; spaced-apart separating members between the outer edges of the two discs; means for securing the discs against the spaced separating members; a cylindrical tread surrounding said discs; a medial flange member extending inwardly from said tread to a slidable position between the two discs, said flange member having openings for the passage of the separating members; an annular spring ring secured about the periphery of each of said discs and projecting outwardly therebeyond, each of said spring rings extending first outwardly from the face of its disc thence inwardly to the medial flange of said tread, there being receiving notches in said flange for the outer edges of said spring rings, the outwardly and inwardly extending portions of said spring rings giving the latter V-shaped cross sections with the open sides facing each other, so that downward movement of the axis of said discs will tend to close the V-shaped cross-section on the bottom of the wheel and open the same on the top thereof.

6. A resilient wheel for attachment to a hub flange having wheel attachment studs comprising: a wheel disc arranged to be secured on said flange by said studs; an inner disc secured adjacent its axis to the inner face of said wheel disc; spaced-apart separating members between the outer edges of the two discs; means for securing the discs against the spaced separating members; a cylindrical tread surrounding said discs; a medial flange member extending inwardly from said tread to a slidable position between the two discs, said flange member having openings for the passage of the separating members; an annular spring ring secured about the periphery of each of said discs and projecting outwardly therebeyond, each of said spring rings extending first outwardly from the face of its disc thence inwardly to the medial flange of said tread, there being receiving notches in said flange for the outer edges of said spring rings, the outwardly and inwardly extending portions of said spring rings giving the latter V-shaped cross sections with the open sides facing each other, so that downward movement of the axis of said discs will tend to close the V-shaped cross-section on the bottom of the wheel and open the same on the top thereof; and a plurality of individual spring tongues in said spring rings formed by radially extending slots cut in the V-shaped portions thereof.

JAMES E. GRIFFITH.